United States Patent [19]

Reed

[11] 4,182,234
[45] Jan. 8, 1980

[54] NON-DESTRUCTING EGGSHELL EGG CONTENTS REMOVER

[76] Inventor: Winston H. Reed, 104 Mill St., Shelton, Conn. 06484

[21] Appl. No.: 866,625

[22] Filed: Jan. 3, 1978

[51] Int. Cl.² .............................................. A23B 5/00
[52] U.S. Cl. ..................................................... 99/495
[58] Field of Search .................. 99/516, 567, 565, 568, 99/495

[56] References Cited

U.S. PATENT DOCUMENTS

| | | | |
|---|---|---|---|
| 2,445,490 | 7/1948 | Meade | 99/495 |
| 2,594,619 | 4/1952 | Bosch | 99/495 |
| 2,735,464 | 2/1956 | Kerven | 99/495 |
| 3,090,412 | 5/1963 | Conrad | 99/495 |
| 3,249,137 | 5/1966 | Conrad | 99/495 |

Primary Examiner—Edward J. McCarthy
Attorney, Agent, or Firm—Mattern, Ware, Davis & Stoltz

[57] ABSTRACT

A non-destructing eggshell egg contents remover incorporates an egg receiving assembly incorporating an egg cup receptacle having a soft resilient hollow concave recess for placement of an egg therein. Protruding through the bottom portion of the egg receiving assembly is a pair of tubes, an egg contents discharge tube for receiving the extracted contents of the egg and an air inlet tube for forcing compressed air into the egg causing its contents to be removed through the discharge tube. The egg receiving assembly may be placed on a base adapted for holding in the user's hand and incorporating a rubber bulb or bellows positioned thereon for activation by the user's hand while holding the base. Other embodiments of the present invention provide for placing the egg receiving assembly in an open shelf-type housing with the air inlet tube either adjacent the egg contents discharge tube or positioned above the egg and insertable therein.

42 Claims, 24 Drawing Figures

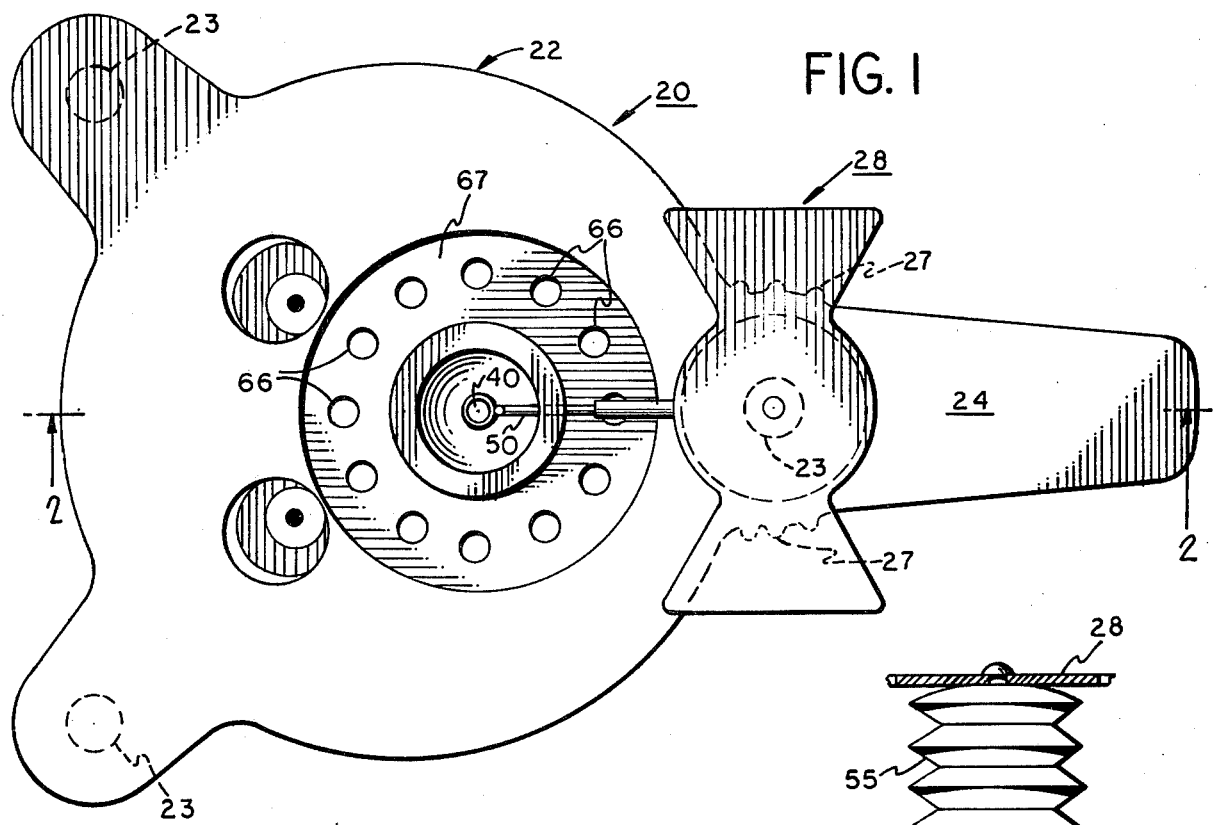
FIG. 1
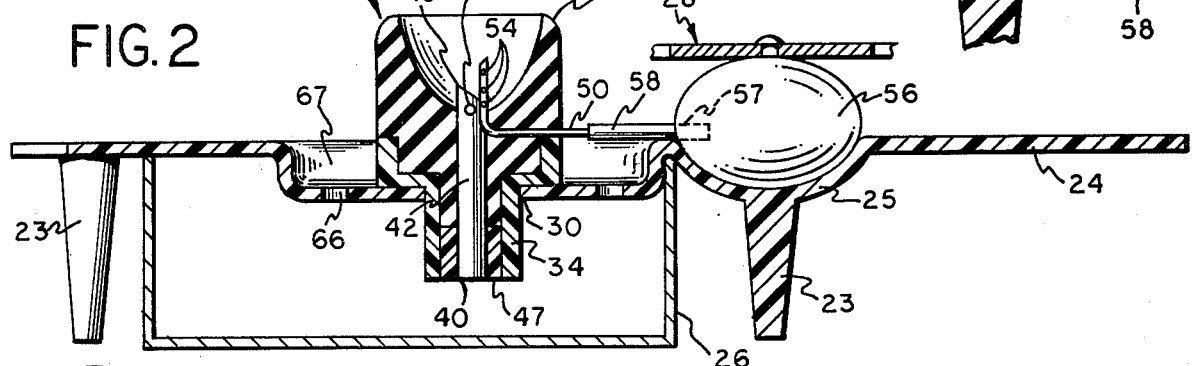
FIG. 2A
FIG. 2
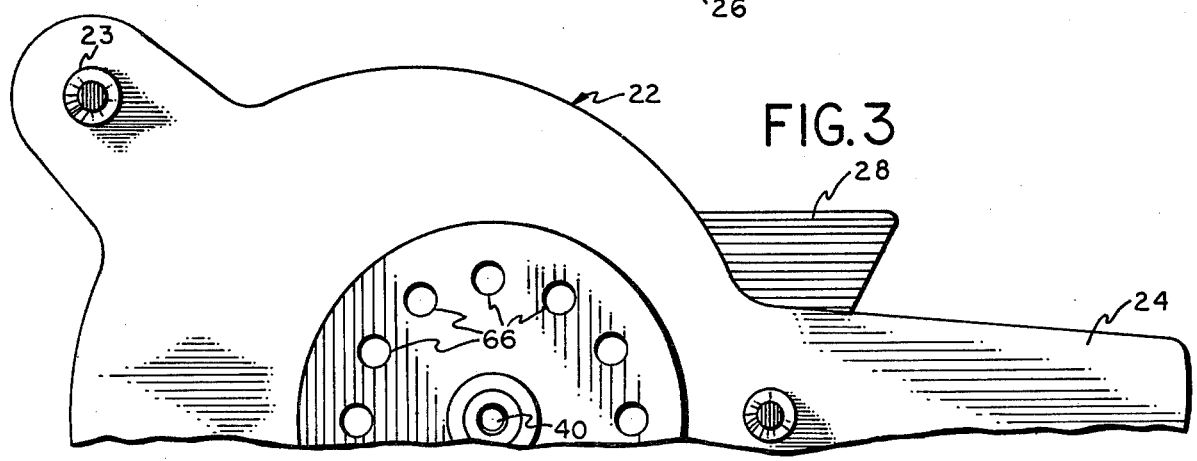
FIG. 3

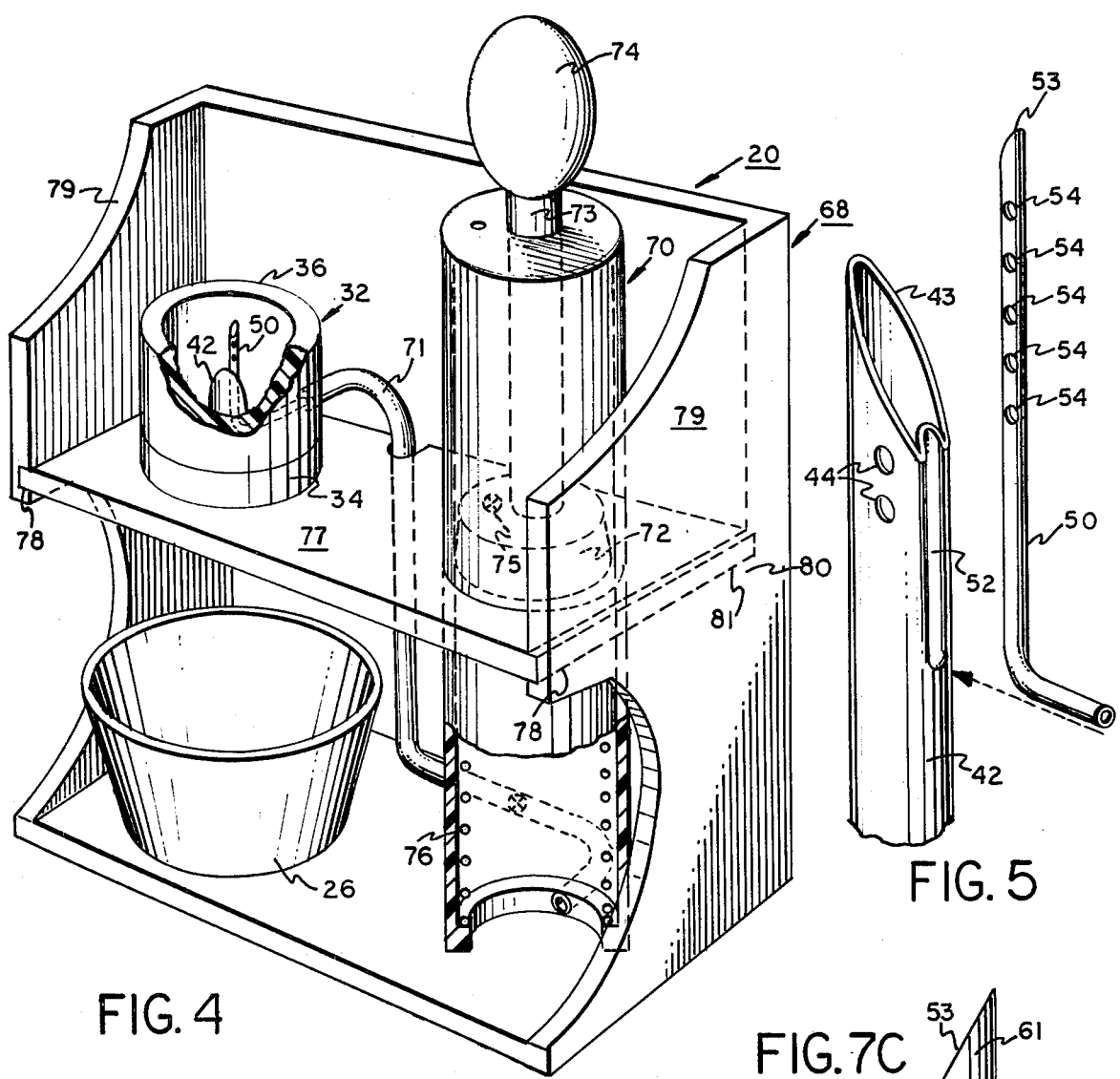
FIG. 4
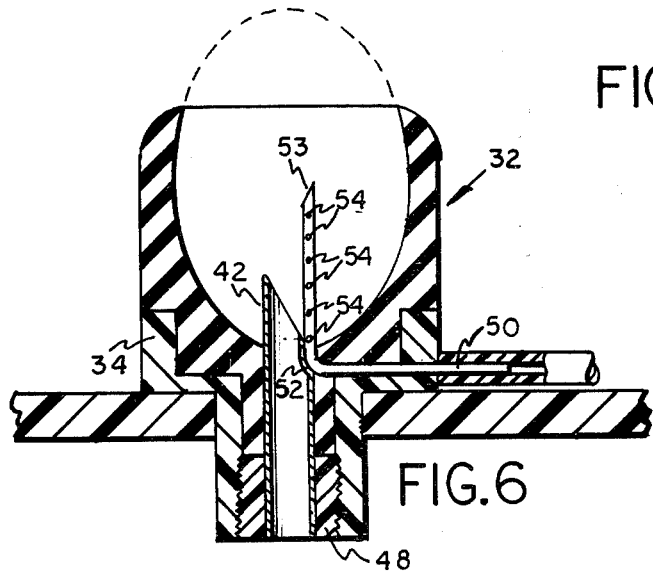
FIG. 6
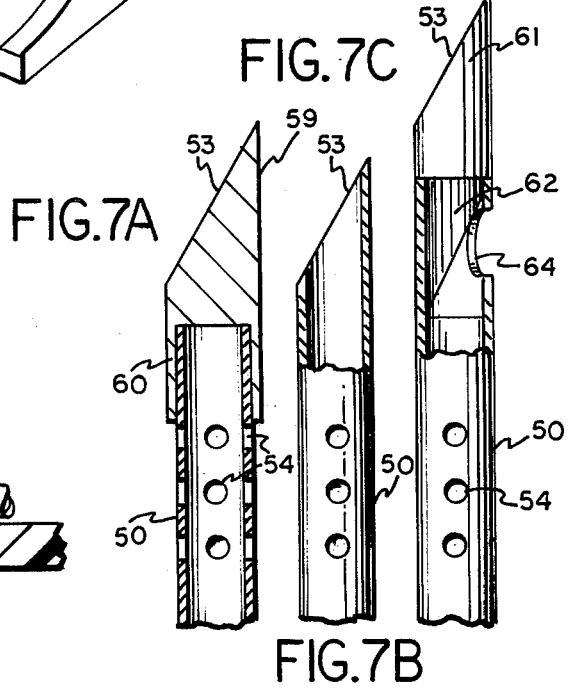
FIG. 5
FIG. 7A  FIG. 7C
FIG. 7B

NON-DESTRUCTING EGGSHELL EGG CONTENTS REMOVER

BACKGROUND OF THE INVENTION

1. Field of the Invention

The present invention relates to egg contents removers, and in particular, egg contents removers adapted for home use which do not break the eggshell.

2. Description of the Prior Art

Eggs are used around the world as an important food item, and in many areas are almost a daily part of the family diet. The egg is a beautiful example of compact individual packaging by nature. The egg contents are nutritious and are prepared for the table in many ways. While the eggs of many species of birds or reptiles are used by man as a food, the eggs of the chicken (hen's eggs) constitute the major type of egg consumption. Approximately seventy billion eggs are produced in the United States per year.

Eggshells can be drilled or pierced with a hole or holes and the fluid or semi-fluid contents; i.e., the egg whites and egg yolks, can be blown out or sucked out and the contents saved for use as food. Empty egg shells thus prepared may be used as ornaments or may be decorated for use in religious festivals or for ceremonial or hobby purposes. Indeed, the egg is a symbol of fertility and of the coming of life in many cultures throughout the world, and the empty egg shell is used by many such cultures, particularly at Easter and Christmas.

Eggshells of various bird and reptile species are also of great importance to ornitholigists, serious bird watchers, and herpetologists. To such people the collecting of eggshells from various species requires the egg contents to be laboriously removed by sucking or blowing (as discussed later) if the eggshells are to be preserved.

Furthermore, emptied eggshells have many applications in the arts and crafts, as is evidenced by the many craft books and magazines available today. The small holes left in the egg shell are easily sealed so as to be nearly invisible, and when so sealed, the egg shell will float in water and many other fluids. In addition, the emptied eggshell can be strengthened if desired by injecting a suitable coating material, such as plaster or plastic resin solution, and then shaking and rotating the egg. It may also be coated on the outside. Indeed, the craft uses for emptied eggshells have increased to the point where imitation eggshells are made from plastic derived from petrochemicals. Such use of petrochemicals is, of course, an additional cost in both money and energy. Thus, the emptied eggshell, if more generally available for home use, would be both desirable and economical.

Nevertheless, until the present invention, the process of manually drilling out a hole and extracting the egg white and egg yolk by blowing or sucking has been a slow, laborious and messy task. These early methods have required that the eggshell first be drilled with a small hole of approximately ⅛th inch in diameter and a larger discharge hole of about ¼ inch in diameter drilled at the other end of the egg. The usual machine drills available to the average person are not well suited to drilling eggs since, even when operated gently, they often break the eggshell. Such drilling usually requires holding the egg in one hand and drilling with the other, which also presents a safety hazard. Furthermore, the manual blowing of the egg by mouth or by a straw inserted in the small drilled hole and blown by the user, introduces a sanitary problem, since the egg contents may easily be contaminated by the saliva of the user. This contamination is especially dangerous since the egg contents form a perfect culture for many types of microorganisms.

Besides being laborious, the previous methods of extracting egg contents have also been undesirable since the size of the air inlet hole is critical. If the air inlet hole is too small, the blowing out process is very slow, and if the air inlet hole is too large, then a vigorous user may actually cause the egg to break. Due to these many difficulties in home blowing of eggs, it is rarely done except on special occasions and, even then, in relatively few homes.

It is to this problem that the present invention is directed. The present invention is a non-destructing eggshell egg contents remover which incorporates an egg receiving assembly comprising a resilient hollow egg cup receptacle, an egg contents discharge tube passing through the egg receiving assembly and protrudable into an egg within the egg cup receptacle, an air inlet tube protrudable into an egg, and means such as a bellows or rubber bulb for forcing air into the air inlet tube; thereby displacing the egg contents with air and removing these egg contents through the discharge tube.

Although a number of prior art devices deal with eggs, and more particularly, with egg contents removing, none of these prior art devices disclose or suggest a non-destructing eggshell egg contents remover incorporating a resilient egg cup receptacle, an egg-contents discharge tube, an air inlet tube protrudable into the egg, and a source of compressed air for forcing air into the egg via the air inlet tube.

More particularly, although U.S. Pat. No. 2,446,310, Gaylord, discloses an egg opener with pneumatic shelling means where air is forced into the egg via cone 16 in combination with pump 13 and cylinder 11, this patent does not disclose or suggest an egg content discharge tube cooperating with the air inlet tube for receipt of the egg contents without destroying the eggshell. Gaylord removes the egg contents, which are previously hard boiled, by means of cutter assembly 18 that slices off one end of the egg for removal of the contents when air is inserted at the other end of the egg. No discharge tube is used or contemplated by Gaylord since the device disclosed is adapted for removing boiled egg contents.

U.S. Pat. No. 2,800,409, Webb et al. discloses an egg filling process and resulting product wherein an egg has its contents removed followed by spraying a solution of gum arabic and ethyl alcohol into the emptied egg. The egg is then dried and filled with chocolate or some other confectionary. In the removing process, the egg sits on a suction cup 11 having a passage 15. The egg has two holes drilled through the shell at 2 and 3 and is placed on passage 15, thereafter having its contents removed by suction pump 10. Thus, this device does not have or suggest an air inlet tube for forcing air into an egg so as to remove its contents with compressed air pressure.

U.S. Pat. No. 3,951,055, Woebbeking, discloses a hand operated egg blower for removing a hard boiled egg from its shell. Two holes are made in the egg and an air bellows placed around the egg. The air pressure then forces the hard boiled egg through the bottom hole. Woebbeking does not disclose or suggest an egg contents remover for uncooked eggs nor does it disclose an egg contents discharge tube and air inlet tube for obtaining the removal of the egg contents.

U.S. Pat. Nos. 2,224,931, Weimer and 3,249,137, Conrad, disclose machines for perforating eggs. Weimer discloses a device having a pin passing through a seat to which the egg is placed, while Conrad discloses a device for making two holes in each of a number of eggs placed within the machine by use of long pins which are quickly inserted and removed from the eggs. The Weimer device is adapted for perforating an egg in order to vent air when the egg is boiled. The Conrad device is used in conjunction with a second machine which removes the egg contents after their double perforation by the Conrad machine. Thus, these devices neither disclose nor suggest a non-destructing eggshell egg contents remover where one or two holes are placed in the egg for forcing air into the egg and removing the contents through an egg contents discharge tube.

Other prior art egg devices are directed to commercial machines for removing the contents of many eggs in a highly automated fashion. Four patents in this category are U.S. Pat. Nos. 2,445,490, Meade, 2,446,812, Cribb et al, 2,594,619, Gosch et al., and 3,055,407, Conrad. All of these devices use some form of piercing technique to make holes in the egg with the egg contents subsequently transferred to a chamber or tray by means of suction or forced air. None of these devices utilize a first tube for receiving the contents of the egg and the second tube for forcing compressed air into the egg for removal of the contents via the first tube.

Thus, Meade punches holes in the top and bottom of the egg and subsequently sucks out the contents at the bottom of a container; the container being evacuated by suction pipes 14. In Cribb et al, a group of hollow needles 10 are provided with suction by communication with a vacuum chamber 1. Eggs are automatically dropped onto the hollow needles, thereby cracking the eggs and removing their contents. In Bosch et al, the machine first cracks the bottom portion of the eggs followed by piercing them at their bottoms and tops and then forcing the contents of the eggs into a receiving tray by means of compressed air. Again, the machine is adapted for mass production and is fully automated. Finally, Conrad pierces two holes in a plurality of eggs, with the smaller holes made at the top, and the eggs subsequently turned over for removal of ther contents by an evacuator.

Other prior art patents are related to various sophisticated production machines which do not disclose or suggest the present manually operated non-destructing eggshell egg contents remover. Thus, U.S. Pat. No. 2,443,188 Hodson, discloses a complicated production machine not designed for home use that does not puncture or drill eggs but actually grinds them around their circumference and then cuts through the membrane within the egg by a separate conveyorized belt of knives so that the egg contents can be dropped into cups on a conveyor for inspection.

U.S. Pat. No. 3,147,786, Noltes, discloses a production machine for opening and separating the yolks of eggs from the whites. The machine is conveyorized and complicated and operates by slicing off the bottoms of the eggs and piercing a hole in their tops. The device does not provide for an air inlet tube or an egg contents discharge tube as disclosed in the present invention, nor is provision made to save the shell in an unbroken state. The egg separating feature of the present invention is used in conjunction with egg contents remover and therefore is not anticipated or suggested by Noltes.

Other patents relating to eggs which are believed to be of lesser relevance than the above-cited prior art patents are listed in Table I below:

Table I

| U.S. Pat. No. | Inventor | Issue Date | Title | Brief Description |
| --- | --- | --- | --- | --- |
| 205,313 | Stemple | 1878 | Improvement of Process of Treating Preserved Eggs | States that preserved eggs from solutions cannot be boiled without cracking. Pierces small hole in butt end, but hole should not pass through cuticle envelope of egg. |
| 498,488 | Power | 1893 | Process of Extracting the Contents of Eggs | Centrifuge method. |
| 963,407 | Uhlier | 1910 | Piston Device and Spear for Hard Boiled Eggs | Piston device and spear for hard boilded eggs. |
| 968,910 | Woodrow | 1910 | Egg Separator | |
| 1,163,873 | Thornburgh | 1915 | Process of Treating Eggs | Heat Treatment |
| 1,184,499 | Wilhermsdorfer | 1916 | | Cigar Cutter |
| 1,316,315 | Mars | 1919 | Implement for Use in Removing Contents of Eggs | Opener for hard boiled eggs |
| 1,491,908 | Greig | 1924 | Device for Cutting Off or Facilitating the Removal of the Tops of Egg Shells | A hard boiled egg holder and piercer having a serrated inner ring. The egg may be twisted to cut the shell. |
| 1,496,312 | Harkin | 1924 | Method of Separating Egg Values | Mass production of mixed white and yoke or separated slits. |

Table I-continued

| U.S. Pat. No. | Inventor | Issue Date | Title | Brief Description |
|---|---|---|---|---|
| | | | | does not pierce eggs; no shell recovery. |
| 1,618,682 | Snapp | 1927 | Egg Sheller | Breaks shells from hard boiled eggs. |
| 1,635,843 | Hoffman | 1927 | Method of Preserving Eggs | Introduces antiseptic through hole made in egg, then seals hole with paraffin or other material. |
| 1,837,357 | Chapman | 1931 | Egg Handling Apparatus | Production unit, shells are cut with a saw. |
| 1,945,788 | Pilley | 1934 | Egg Breaking Machine | Very complicated, mass production breaking of eggs. |
| 1,945,860 | Loffler | 1934 | Method of Recovery of Egg Whites | Vacuum cleaner for whites left inside surface of broken egg shells. |
| 2,032,939 | Kammeyer | 1936 | Device for Opening Eggs | Another hard boiled egg device. External cutter turned with key. |
| 2,075,270 | Cleveland | 1937 | Egg Breaking & Separating Apparatus & Process | Slices egg to make hole - production method. |
| 2,161,910 | Callahan | 1939 | Article of Food | Wire holder one inserts in egg perhaps prior to boiling. Can be used to slit shell of boiled egg. Is for individual use. |
| 2,206,960 | Irish | 1940 | Process & Apparatus for Breaking Eggs & Salvaging Liquid Egg Material | Mass production. - Breaks eggs in half. |
| 2,550,189 | Droege | 1951 | Bulk Egg Breaking & Separating Method | Centrifuge Method. |
| 2,669,518 | Torr | 1954 | Method of Treating Whole Egg | Colloidal dispersion of egg shell & contents. Information relating to shell strength. |
| 2,673,160 | Feeney | 1954 | Method of Preserving Shell Eggs | Flame sterilization of shell exterior - Information relating to egg spoilage. |
| 2,898,961 | Kauffman | 1959 | Egg Breaker & Shell Expresser | Production machine |
| 3,106,234 | Conrad | 1963 | Egg Evacuating Means | |
| 3,203,458 | Shelton | 1965 | Egg Opening & Separating Method | Mass production. |
| 3,207,198 | Beeson, Jr. | 1965 | Method & Apparatus for Breaking & Separating Eggs | Production technique using sonic beam to crack egg. |
| 3,307,600 | Fuge | 1967 | Method & Apparatus for Decapping Eggs | A side operating guillotine device to cut top off egg. |
| 3,448,782 | Williams | 1969 | Egg Handling Machine | |
| 3,764,714 | Driggs | 1973 | Cooking & Peeling the Hard Boiled Eggs | Information relating pH level of egg contents to strength of egg. |

None of the above prior art patents either solely or in combination with each other disclose or suggest the novelty of the present invention; namely, a manually operated non-destructing eggshell egg contents remover for discharging the contents of an egg while leaving intact the eggshell. The operation of the present invention, incorporating an egg contents discharge tube passing through an egg receiving assembly holding the egg and a second air inlet tube protruding into the egg, the air inlet tube having air supplied to it by means of a hand-operated bellows or similar device is not shown or suggested by any of these prior art patents.

SUMMARY OF THE INVENTION

The present invention is a manually operable device for removing the contents of an egg without destroying the eggshell. In a preferred embodiment of the present invention, the non-destructing eggshell egg contents remover comprises a soft resilient egg receiving cup assembly incorporating an egg cut receptacle having a hollow concave recess dimensioned for resiliently grasping an egg. This egg receiving assembly is positioned on a base adapted for holding in the user's hand. The egg receiving assembly also incorporates a vertically disposed base within which an egg discharge tube is placed. The egg discharge tube protrudes within the concave recess of the egg cup receptacle so as to penetrate the shell of an egg placed therein.

Associated with the egg discharge tube is an air inlet tube positioned adjacent the egg discharge tube and having a substantially smaller diameter. This air inlet tube also protrudes within an egg placed on the egg cup receptacle and forces air into the egg by means of a hand operated air bellows or rubber bulb. The bellows or bulb is preferably placed on the base and positioned for one-handed operation by the user's hand holding the base.

Operation of the bulb or air bellows forces air into the air inlet tube and thus into the egg placed on the egg cup receptacle which in turn displaces the white and yolk within the egg; thereby forcing the egg contents out through the egg discharge tube. Since the amount of air, as well as the force of this air applied to the egg, is controllable by the user, the present invention allows one to remove the white and yolk of an egg while preserving intact the eggshell.

The base utilized in this embodiment of the present invention may be shaped in a configuration to represent a fanciful animal or other character. Such a version of the present invention is particularly suited for children. Once the contents of the egg have been removed, the inner surface of the eggshell can be cleaned by rinsing with water. This rinsing may be done by filling the emptied egg with water and removing the water with the present invention.

An alternate embodiment of the present invention mounts the egg receiving assembly on a shelf-type housing wherein the air inlet tube may alternately protrude into the upper region of the egg opposite the egg discharge tube. The rubber bulb or air bellows in this alternate embodiment may comprise a simple manual air pump connected to the air inlet tube by a flexible hose or channeled member in the backwall of the shelf-type housing.

The egg discharge tube may have one of several configurations for both piercing the egg and for receipt of its contents. All of these configurations have a sharp truncated conical egg piercing end. The egg discharge tube may alternatively be formed from corrugated tubing so that it forms a plurality of vertical recesses with the vertically disposed bore in the egg receiving assembly so as to collect any egg contents which spill within the concave portion of the egg cup receptacle.

Additionally, the base on which the egg receiving assembly is placed may incorporate one or more holes for removing any egg contents which may have spilled over the upper rim of the egg cup receptacle.

Various embodiments of the egg cup receptacle, egg discharge tube, and air inlet tube are disclosed for allowing easy fabrication of the invention. An additional embodiment provides a removable sleeve for utilizing egg discharge tubes of various diameters.

OBJECTS OF THE INVENTION

Therefore, it is a principal object of the present invention to provide a manually operable device for removing both the egg white and egg yolk contents of an egg without destroying the eggshell;

Another object of the present invention is to provide a non-destructing eggshell egg contents remover of the above description having an air inlet tube, an egg discharge tube cooperating with an egg receiving assembly so that air forced into the air inlet tube displaces the contents of the egg forcing the contents out of the egg discharge tube;

An additional object of the present invention is to provide a non-destructing eggshell egg contents remover as described above having a hand-holdable base to which the remaining portion of the device is attached including an air bellows or rubber bulb positioned on the base for one-hand operation;

Another object of the present invention is to provide a non-destructing eggshell egg contents remover of the above description having a hand-holdable base configured in the design of a fanciful animal or other character;

An additional object of the present invention is to have an alternative embodiment of the non-destructing eggshell egg contents remover having a shelf-type housing on which the egg receiving assembly is attached and a receptacle placed beneath the egg discharge tube for collection of the egg, wherein the egg contents collecting receptacle alternatively incorporates a partition for separating the egg white from the egg yolk;

A further object of the present invention is to provide a non-destructing eggshell egg contents remover utilizing a corrugated elongated egg discharge tube for facilitating the removal of any spilled egg contents within the egg receiving assembly;

Another object of the present invention is to provide a non-destructing eggshell egg contents remover of the above description wherein the base to which the egg receiving assembly is attached is provided with a recess incorporating a plurality of holes for removing any egg contents which spill over the upper rim of the egg cup receptable of the egg receiving assembly;

A further object of the present invention is to provide a non-destructing eggshell egg contents remover incorporating an egg cup receptacle support member dimensioned for easy insertion of an egg discharge tube and air inlet tube, both having a straight line configuration;

A further object of the present invention is to provide a non-destructing eggshell egg contents remover of the above description wherein the support member has a central bore for insertion of one of a number of sleeves having inner diameters for insertion of various size egg discharge tubes.

Other objects of the present invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

For a fuller understanding of the nature and objects of the invention, reference should be had to the following detailed description taken in conjunction with the accompanying drawings, in which:

FIG. 1 is a plan view of a non-destructing eggshell egg contents remover according to the present invention operable by one hand of a user and incorporating a base with a fanciful character design;

FIG. 2 is a cross-sectional side elevational view of the embodiment of the present invention taken along line 2—2 in FIG. 1;

FIG. 2A is a partial cross-sectional side elevational view of the invention similar to that shown in FIG. 2, illustrating the use of an air bellows instead of a rubber bulb;

FIG. 3 is a partially cut away bottom view of the present invention as shown in FIG. 1;

FIG. 4 is a partially cutaway perspective view of a shelf-type embodiment of a non-destructing eggshell egg contents remover according to the present invention;

FIG. 5 is a partially cutaway enlarged perspective assembly view of the protruding end of the egg discharge tube and air inlet tube of the present invention;

FIG. 6 is a partially cutaway cross-sectional side elevational view of the egg receiving cup assembly similar to that shown in FIG. 2, illustrating the air inlet tube passing through the support member;

FIG. 7A is an enlarged partially cross-sectional side elevational view of one type of air inlet tube used in the present invention;

FIG. 7B is an enlarged partially cutaway cross-sectional side view of an alternative embodiment of the air inlet tube used in the present invention having a hollow protruding end;

FIG. 7C is an enlarged partially cutaway cross-sectional side elevational view of another embodiment of the air inlet tube of the present invention having an upper parallelogram cross-sectional shaped tubular member;

FIG. 22 is a cross-sectional side elevational view of the support member shown in FIG. 20 taken along a plane similar to that of FIG. 16 with respect to FIG. 17, illustrating the interconnection of the egg discharge tube and air inlet tube therewith.

DETAILED DESCRIPTION

Figure 8:
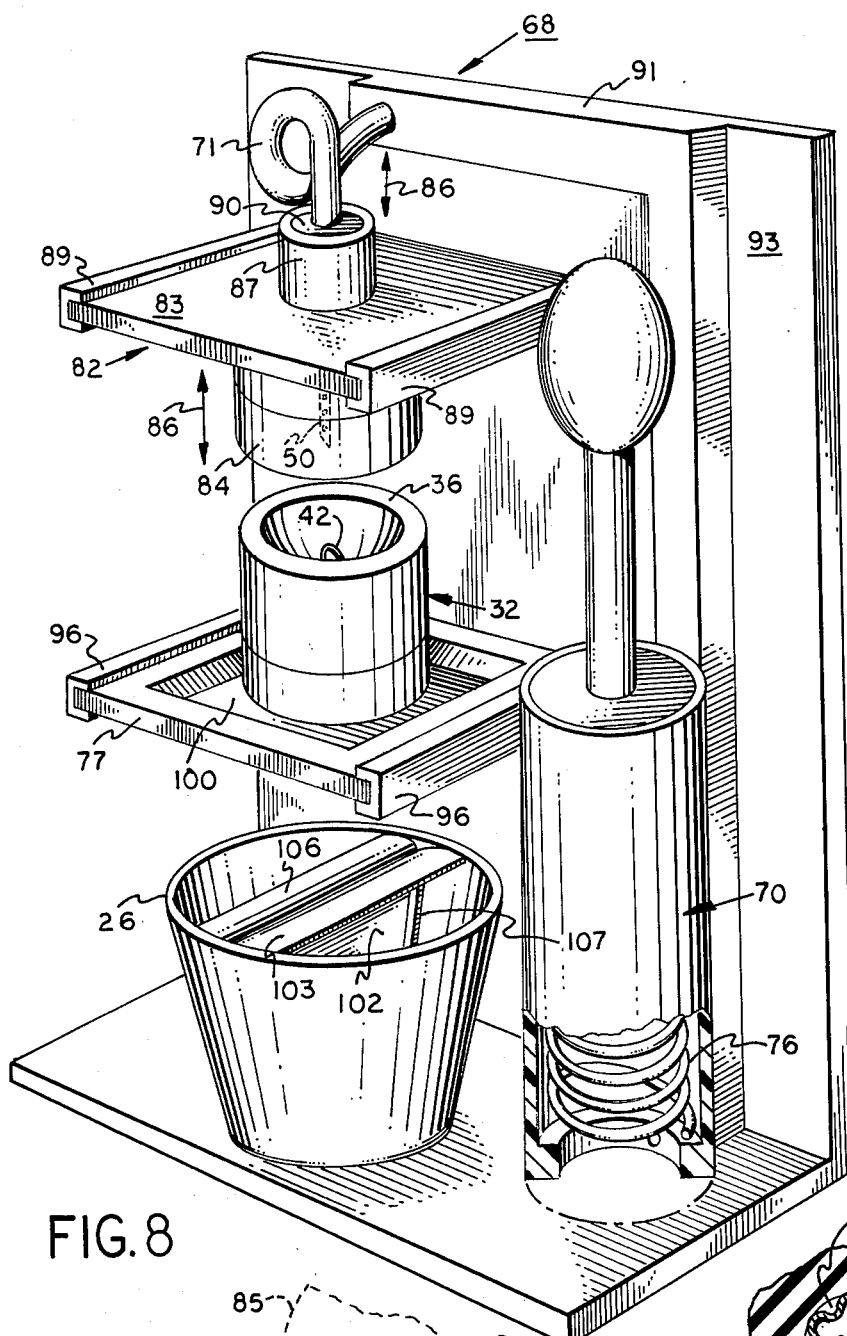
FIG. 8 is a partially cutaway perspective view of an alternative embodiment of the shelf-type embodiment of a non-destructing eggshell egg contents remover utilizing an upper egg receiving member.

As best seen in FIGS. 1, 2 and 3, a non-destructing eggshell egg contents remover 20 may be dimensioned for holding in a user's hand. A base 22 incorporates a handle portion 24 for easy grasping and operation of the device. The main portion of base 22 incorporates three legs 23 for either placing the device on a flat surface or for maintaining the device over an egg receiving receptacle 26. The base may be shaped to represent any of a variety of fanciful animals or other characters, such as a fanciful bear as shown in FIGS. 1 and 3. In this embodiment, a "bow-tie" 28 may be incorporated in the device for decoration and function, as will be explained later. The base is preferably balanced to remain on its legs 23 with or without other portions of the present invention installed thereon.

The base has a central hole 30 through which an egg receiving cup assembly 32 is placed. This egg receiving assembly incorporates a support member 34 attached to base 22. Alternatively, it may be fabricated integrally with the base. This support member is preferably made from metal or plastic so as to be rigid and thereby support resilient egg cup receptacle 36 of receiving assembly 32. The egg cup receptacle is preferably formed from rubber or other elastomer and has a hemispherical concave recess 38 dimensioned for placement of chicken or other similar sized eggs. This recess is preferably about 1½ inches in depth, having a maximum internal diameter of approximately 1½ inches. The recess should be sufficiently deep to give side support to the egg as it is urged into the recess. The sides of the recess may form a non-permanent seal with the egg placed therein. This size receptacle accommodate the largest of chicken eggs, as well as many other eggs including duck and most other bird eggs. Other size egg cup receptacles may be used for larger or smaller eggs.

The egg receptacle has a central bore 40 through which an egg discharge tube 42 is secured. As best seen in FIGS. 2 and 5, the discharge tube has a protruding end 43 of a sharp elongated eliptical shape. The lower portion of this protruding end is at a level equal to or below the lowermost portion of recess 38. This placement of the discharge tube within the egg recess allows for the penetration of the tube within an egg placed in the egg receptacle, as well as minimizing the buildup of discharged egg contents within the receptacle. In order to facilitate the removal of the egg contents, the egg discharge tube may incorporate one or more side holes 44 for collecting the egg contents.

Figure 10:
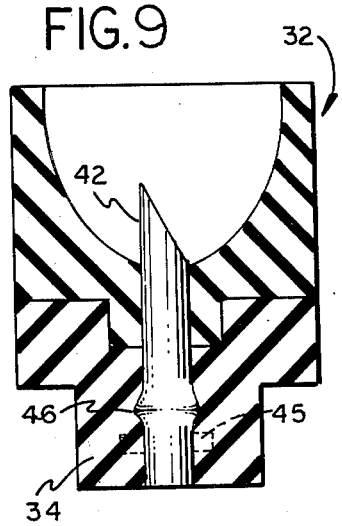
FIG. 10 is a cross-sectional side elevational view of an alternative embodiment of the egg receiving cup assembly and egg discharge tube of the present invention wherein the egg discharge tube incorporates a swaged portion.

The discharge tube 42 preferably has an outside diameter of approximately 11/32 of an inch and an inside diameter of 5/16 of an inch. The tube is preferably constructed of a metallic substance such as stainless steel, which is chemically inert with respect to the egg and egg contents. A ceramic and metal combination material (ceramet) may also be used if it is chemically inert and possesses rigidity without being brittle. As best seen in FIG. 10, the discharge tube may have a swaged region 46 or a flange 45 (shown in phantom) for maintaining its position within the egg receiving assembly 32. In this position, the discharge tube 42 is locked within the support member or bushing 34, wherein this support member is alternatively formed from rubber or other elastomer.

Figure 15:
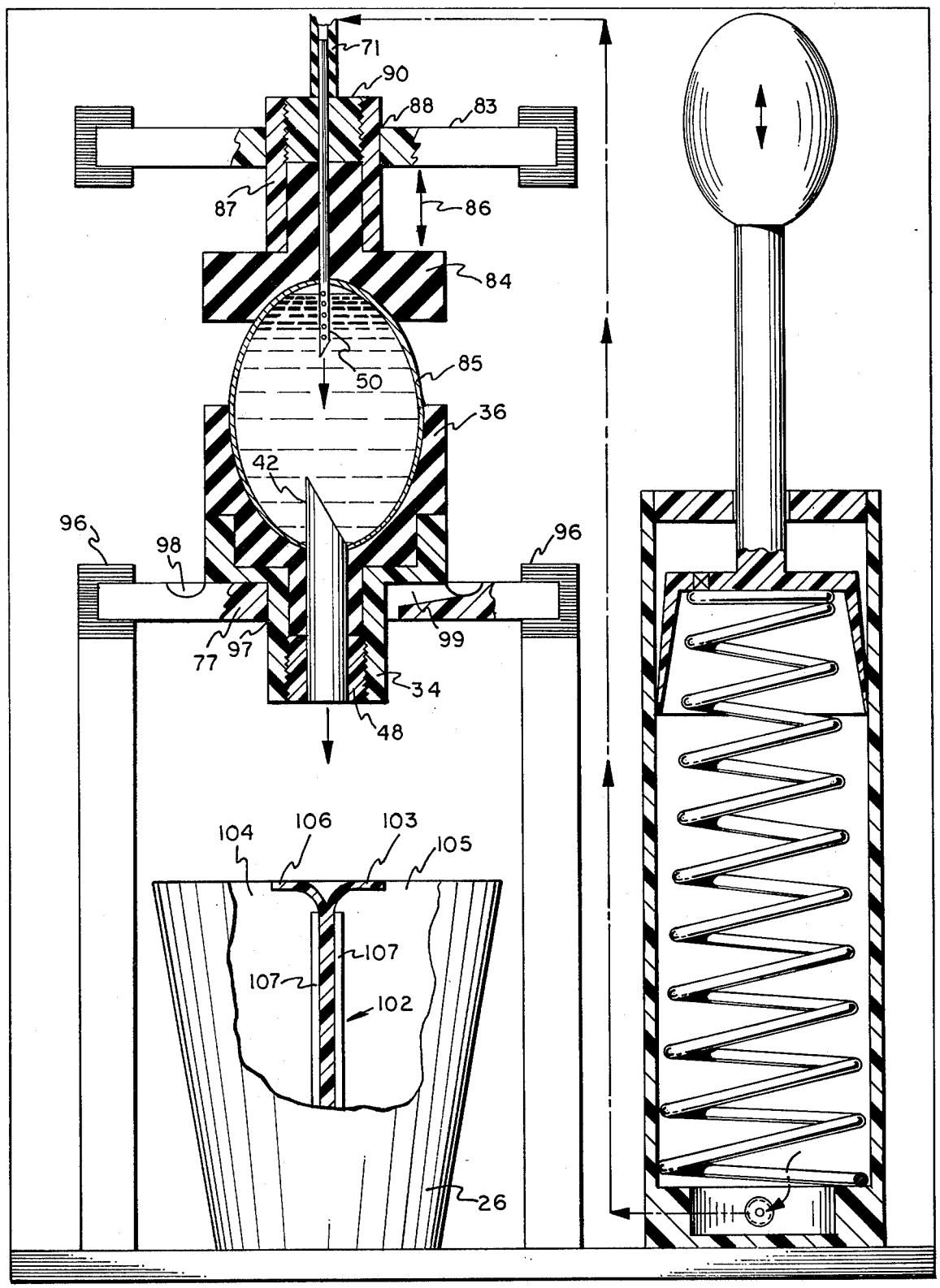
FIG. 15 is a front elevational partially cutaway and partially cross-sectional view of a shelf-type embodiment of the present invention similar to the embodiment shown in FIG. 8.
Figure 16:
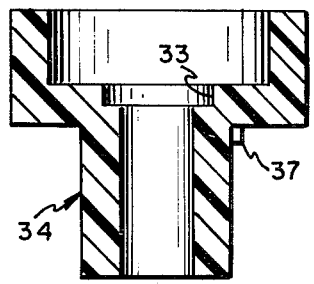
FIG. 16 is a cross-sectional side elevational view of an alternate embodiment of the support member taken along line 16—16 of FIG. 17 used in conjunction with various embodiments of the eggshell egg contents remover.
Figure 17:
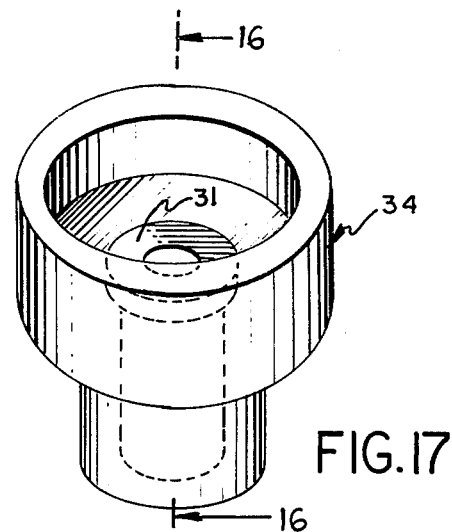
FIG. 17 is a perspective view of the support member shown in FIG. 16 as well as a sleeve inserted therein.
Figure 18:
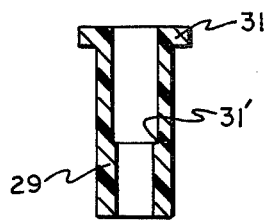
FIG. 18 is a cross-sectional side elevational view of the sleeve shown in FIG. 17 taken along line 16—16 of FIG. 17.

As best seen in FIGS. 2, 6 and 15, the discharge tube may also be held within the egg receiving member assembly by means of either a press fitted bushing 47 or a threaded bushing 48.

Figure 12:
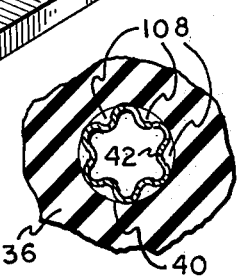
FIG. 12 is a cross-sectional plan view taken along line 12—12 of FIG. 11, of the egg discharge tube and egg cup receptacle of the present invention incorporating a corrugated type discharge tube.
Figure 13:
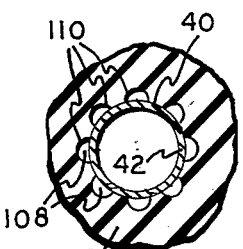
FIG. 13 is a cross-sectional plan view taken along line 13—13 of FIG. 11, of the egg discharge tube and egg cup receptacle similar to FIG. 12 illustrating scalloped vertically disposed sluiceways in the egg cup receptacle.
Figure 11:
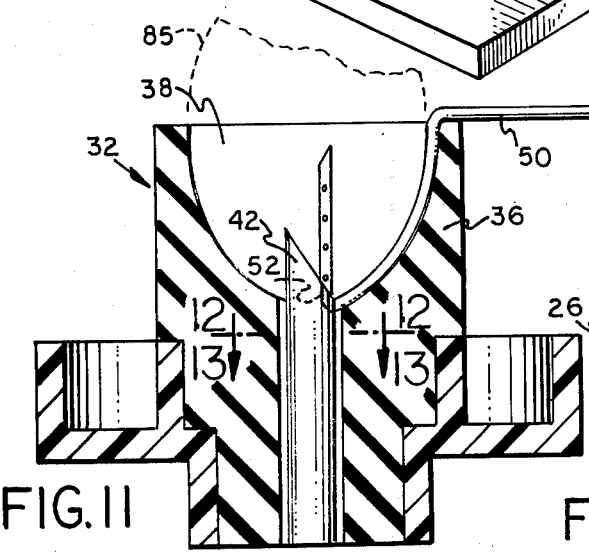
FIG. 11 is an enlarged cross-sectional side view of the egg receiving cup assembly and alternative embodiment of the air inlet tube of the present invention.
Figure 14:
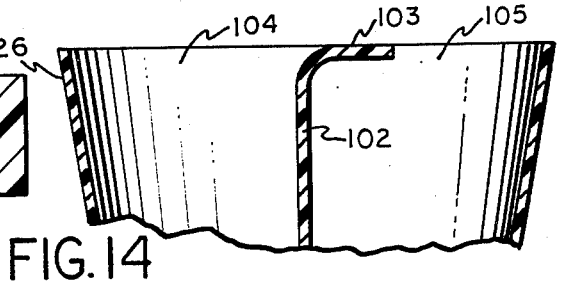
FIG. 14 is a partially cutaway cross-sectional side elevational view of the egg contents receiving receptacle used in conjunction with the various embodiments of the present invention.

FIGS. 11, 12 and 13 show two alternate embodiments for the discharge tube 42 and egg receptacle 36 which help remove any egg yolk or egg white remaining in the recess 38 of the egg cup receptacle 36. Thus, as shown in FIGS. 11 and 12, the egg discharge tube may be formed from an elongated corrugated material wherein vertically disposed sluiceways 108 are formed between the discharge tube 42 and bore 40 in egg receptacle 36. These sluiceways drain away any egg contents accumulated at the bottom of recess 38 in egg receptacle 36.

A similar elimination of egg contents from the egg receptacle 36 is obtainable in the egg receptacle and egg discharge tube embodiment shown in FIG. 13 wherein the discharge tube is formed from a cylindrical material and the bore 40 incorporates a plurality of vertically scalloped regions 110 forming sluiceways 108 with the discharge tube 42.

Referring again to FIGS. 1, 2 and 3, an air inlet tube 50 also has a protruding end into recess 38 of egg receptacle 36. This air inlet tube supplies a source of compressed air into the egg placed within the receptacle; thereby displacing the egg white and egg yolk, forcing these egg contents down into the egg discharge tube 42. As best seen in FIGS. 2, 5 and 6, the air inlet tube 50 may be maintained in its vertical relationship with respect to the egg receptacle by engaging with a vertically disposed groove 52 formed at the upper end of egg discharge tube 42. When the air inlet tube has this configuration, an egg placed within the egg receptacle has one hole punctured at its lower end for receipt of both the air inlet tube and the egg discharge tube. The air inlet tube should have a maximum extension less than the height of the egg cup receptacle in order to ensure safety to the user when inserting eggs therein. The air inlet tube should preferably extend above the egg discharge tube by ⅜ of an inch.

Alternatively, as seen in FIG. 11, the air inlet tube 50 may extend within egg receptacle 36 along its inner periphery instead of passing through the egg receptacle as shown in FIGS. 2, 4 and 6. This version of the air inlet tube allows easy removal for cleaning. The inlet tube is maintained in its proper orientation by groove 52 in the discharge tube 42. As best seen in FIGS. 2, 5 and 6, the air inlet tube preferably has a sharp extension 53 to facilitate puncturing of the egg with minimal cracking and also may include a series of holes 54 along its side to increase the effective area of the air inlet tube for the release of air within the egg.

As best seen in FIGS. 7A, 7B and 7C, the upper end 53 of the air inlet tube may be hollow or may be solid provided that there is a sufficient number of holes 54 in the air inlet tube to maintain adequate air flow into the egg during operation of the device. Thus, as shown in FIG. 7A, the piercing end may be formed from a solid extension member 59 having a collar 60 for press fitting to air inlet tube 50. In this embodiment, the extension member may be removed for cleaning the air inlet tube or for possible replacement of the extension member.

As best seen in FIG. 7B, the piercing end 53 may be hollow and integrally formed with the remainder of the air inlet tube. FIG. 7C illustrates another replaceable hollow piercing end 53 formed by a parallelogram cross-sectionally-shaped tubular member 61 telescopingly interfitting at its lower end 62 with the inner portion of air inlet tube 50. In this configuration, the air inlet tube also incorporates a large side hole 64 to ensure the proper release of air within the egg if the tubular member 61 becomes clogged. Indeed, the use of multiple side holes 54 insures proper release of air within the egg during operation of the device even if one or more side holes become plugged during the piercing of the egg.

As seen in FIG. 2, the air inlet tube may have a generally L-shaped configuration extending through the side of egg receptacle 36. Alternatively, as shown in FIG. 6, the air inlet tube may extend through support member 34.

Figure 19:
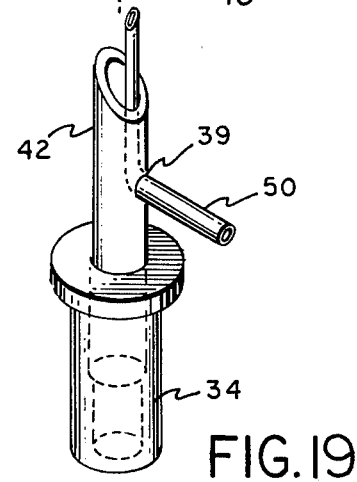
FIG. 19 is a perspective of the sleeve shown in FIG. 18 showing the interconnection of the egg discharge tube and air inlet tube therewith.

As best seen in FIGS. 16, 17, 18, and 19 support member 34 may be fabricated to allow easy insertion and removal of the egg discharge tube 42 and air inlet tube 50. A tab or dimple 37 on the support member allows easy registration of the member with a similarly shaped recess (not shown) in the base. In this embodiment a sleeve 29 preferably made of plastic has an upper shoulder 31 that is dimensioned to fit within annular recess 33 of support member 34. Within sleeve 29 is an inwardly extending shoulder 31' with which egg discharge tube 42 rests as shown in FIG. 19. By varying the inside diameter of sleeve 29, discharge tubes of various diameters may be installed within the same support member. This interchangeability is useful for ornithologists where different size eggs are collected and used with the present invention.

As shown in FIG. 19, the air inlet tube 50 used in this embodiment of the invention may pass through an aperture 39 in the egg discharge tube. This provides for a smaller overall hole to be made within the egg.

Figure 20:
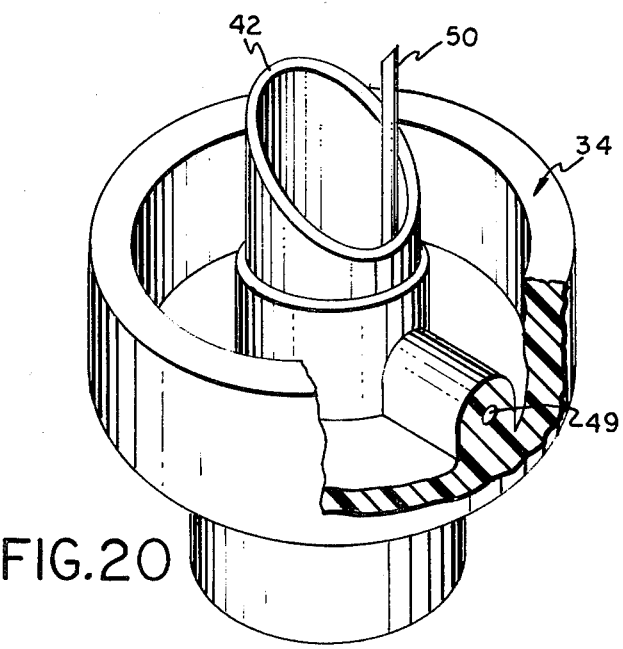
FIG. 20 is a partially cutaway perspective view of an additional alternative embodiment of the support member.
Figure 21:
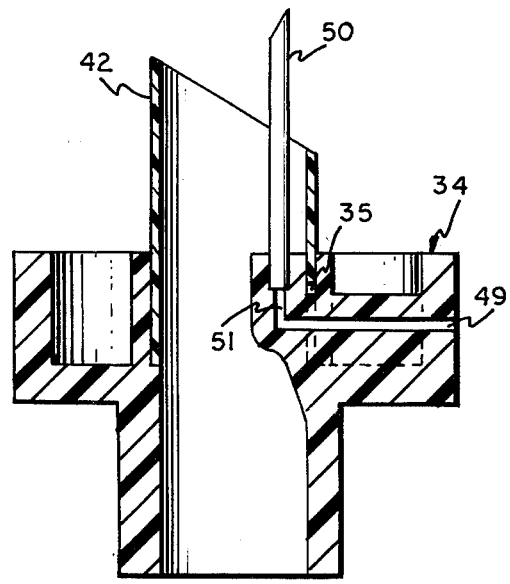

Another alternative embodiment of the support member 34 is shown in FIGS. 20 and 21. Here the support member is fabricated, preferably from plastic, so as to receive a non-bent egg discharge tube 42 and an air inlet tube 50. An egg discharge tube cylindrical recess 35 is formed in the central region of the support member for providing a support to the discharge tube. Inwardly spaced from this recess at one area is an air inlet tube cavity 51 for the receipt of a straight air inlet tube 50. A cylindrical aperture 49 passes through the outer wall of the support member to the air inlet cavity for interconnecting the rubber bulb or air bellows to the air inlet tube. This cavity may slope downwardly as it extends radially outward in order to remove any egg contents that may spill therein. This embodiment of the support member thus allows for relatively easy insertion and removal of the egg discharge tube and the inlet tube as well as their simple straight design.

As shown in FIG. 2, the end of the air inlet tube protruding from the side of the egg receptacle is connected to a rubber bulb 56 by means of a coupling 58. As shown in FIGS. 1 and 2, the rubber bulb is held in a recessed portion 25 of handle 24. This recessed portion may be shaped to represent paws 27 of a fanciful animal, such as a bear. The bulb incorporates a check valve 57 for preventing the suction of egg contents by air inlet tube 50. The bulb may be integrally formed with the egg receiving cup assembly 32 if the assembly is formed from an elastomer along with the bulb. Alternatively, as shown in FIG. 2A, an air bellows 55 also incorporating a check valve 57 may be used for supplying air. Here the handle portion 24 need not have a recessed portion. In this configuration, the egg receiving cup assembly 32 may be easily removed from base 22 by disconnecting the air inlet tube from coupling 58. This greatly facilitates cleaning of the various components of the present invention which, of course, is necessary in order to maintain sanitary conditions. The "bow-tie" 28 is attached to the top of the air bellows so as to facilitate manual squeezing of the air bellows.

The air inlet tube preferably has an outside diameter of approximately 3/32 inch and an inside diameter of approximately 1/16 inch. The side holes 54 of the air inlet tube 50 preferably have a diameter of approximately 0.052 inches. Four to five holes with diameters of 0.052 inches are able to supply sufficient flow of air into the egg when placed on the egg receptacle by manual operation of bellows 56.

Referring again to FIGS. 1, 2 and 3, the base 22 of this embodiment of the present invention incorporates a plurality of overflow holes 66 located in a recessed portion 67 of the base about the region where the egg receiving cup assembly 32 is located. These overflow holes provide passage of any egg white or egg yolk that overflows the upper rim of the egg receptacle 36 into the egg contents receptacle below the base. Such overflow may occur if the bellows 56 are activated too vigorously causing a rapid influx of air into the egg and consequent rapid discharge of egg contents.

The operation of this embodiment of the present invention is extremely simple. An egg is placed within the recess 38 of egg cup receptacle 36 until air inlet tube 50 and egg discharge tube 42 puncture a hole through the lower end of the egg. The air bellows 55 or bulb 56 is then steadily, repeatedly, squeezed at "bow-tie" 28 until the egg whites flow out of discharge tube 42. The bellows or bulb is further operated until the egg yolk portion of the egg is removed. The emptied eggshell is then removed from the egg cup receptacle for rinsing with water. Rinsing is facilitated by filling the egg with water, reinserting the egg in the cup receptacle 36, followed by operation of the rubber bulb to force air in the egg, this displacing the water. The egg contents are thus retrieved while the eggshell is obtained intact for further use.

FIG. 4 illustrates a shelf housing 68 for mounting a shelf-type embodiment of the present egg contents remover 20. In this embodiment, an air pump 70 is utilized in lieu of the bellows 55 or bulb 56 (FIG. 2) to supply compressed air to the air inlet tube 50. A flexible hose 71 connects the air pump to the air inlet tube 50. The air pump is of standard design incorporating a plunger 72 manually actuated by rod 73 and biased upwardly by compression spring 76. The upper portion of this rod may be decoratively capped by an egg-shaped handle 74. The plunger 72 incorporates a one-way valve 75 for focing compressed air through flexible hose 71 into the air inlet hole 50.

This shelf-type embodiment of the present invention is particularly adapted for removing the egg contents of a relatively large number of eggs since the air pump is somewhat more efficient than bulb or bellows and also since the egg contents receiving receptacle 26 is readily maintained in position below the egg discharge tube 42. The shelf housing 68 includes a platform 77 that slidably engages in grooves 78 of sidewalls 79. The platform has a pair of small downward projections 80 (one shown) at each end along its rearwardmost edge which are engageable with a small downward depression 81 along both grooves 78. In this manner, the platform will not slide out of grooves 78 if the housing 68 is tilted forward, yet the platform may be easily removed by lifting upwardly at its rearwardmost end.

FIGS. 8 and 15 show an alternative embodiment to the shelf-type embodiment of the present invention wherein the air inlet tube is projectable into an egg placed within the egg receiving cup assembly 32 by piercing the egg at its opposite, upper, end. This embodiment of the present invention incorporates a removable slideable shelf or platform 83 to which the air inlet tube 50 is attached, by means of an upper egg receiving member 84. This member is preferably made from rubber or other soft elastomer and is fitted into a sleeve 87 to which a plug 90 is threadably interconnected.

As best seen in FIG. 15, the upper egg receiving member is dimensioned to engage the upper extending portion of an egg 85 placed with egg cup receptacle 36.

As best seen in FIGS. 8 and 15, the sleeve 87 passes through aperture 88 of platform 83 and is frictionally secured thereto. Cleaning of this portion of the device is easily accomplished by removal of sleeve 87 from aperture 88 followed by sliding removal of platform 83 from channel members 89. The frictional engagement between the sleeve and the platform 83 is sufficient to maintain the air inlet tube 50 within the egg once the tube has penetrated the shell of the egg. After removal of the egg contents, the upper receiving member 84 may be manually raised so as to remove the egg shell. Movement of the upper egg receiving member is shown by arrow 86.

Figure 9:
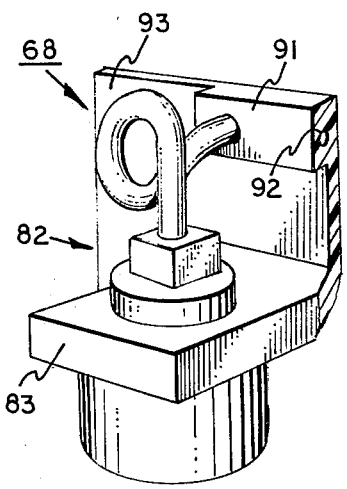
FIG. 9 is a partially cutaway view of an alternative embodiment of the upper egg receiving assembly used in the shelf-type embodiment shown in FIG. 8.

In the embodiment shown in FIG. 8, the air inlet tube 50 engages with flexible hose 71. The flexible hose 71 interconnects with a channeled L-shaped member 91 through which compressed air from air pump 70 passes. As best seen in FIG. 9, the channeled L-shaped member 91 incorporates a central air passageway 92 for the flow of compressed air.

FIG. 9 shows an alternative embodiment for the upper egg receiving assembly 82. In this alternative embodiment of the upper receiving assembly, the platform 83 is integrally connected to the back wall 93 of the shelf housing 68.

As best seen in FIGS. 8 and 15, a lower platform 77 slidably interfits with channel members 96 thereby allowing removal of platform 77 for cleaning. As seen in FIG. 15, the platform incorporates a central passageway 97 through which the support member 34 and egg cup receptacle 36 pass. Removal of platform 77 from the shelf housing 68 allows easy cleaning of both the platform 77 as well as the egg receiving cup assembly 32 and egg discharge tube 42. As seen in FIG. 15, the platform 77 may alternatively embody a circular trough 98 and exit orifice or scupper 99 for removal of any egg yolk or egg white contents that overflow the egg receptacle 36. The embodiment of the platform 77 shown in FIG. 8 utilizes a depression 100 to collect any overflowed egg yolk or egg white contents.

As best seen in FIGS. 4, 8, 14 and 15, the egg contents receiving receptacle 26 may have one of several different configurations for the receipt of the egg white and egg yolks. Thus, as shown in FIG. 4, the egg contents receiving receptacle may simply be a bowl with a sufficient opening and depth for receiving the contents of one or more eggs. The egg contents receiving receptacle shown in FIG. 14 incorporates a partition 102 having a horizontal lip 103 combining to divide the receptacle into two separate regions. These two regions may be utilized for receipt of the egg whites and egg yolks respectively if careful operation of the present invention is performed.

Thus, when the air pump 70 is activated slowly, the air entry within the egg causes the egg white to first be displaced from the egg followed later by the egg yolk. While the egg white is being removed, one compartment of the egg contents receiving receptacle is placed directly below the discharge tube, followed by moving the receptacle to receive the egg yolk in the other compartment. The lip 103 for the egg contents receptacle shown in FIG. 14 allows the egg contents in compartment 104 to be first removed while preventing escape of the contents in compartment 105 due to their abutment against lip 103. After removal of the contents in compartment 104, the egg contents in 105 may be removed by tipping the receptacle in the opposite direction.

FIGS. 8 and 15 show a second alternate embodiment of the egg contents receptacle utilizing a second lip 106 allowing the contents in either compartment 104 or compartment 105 to be first removed. This embodiment of the egg contents receiving receptacle also utilizes side ribs 107 for allowing partition 102 to be slidably removed from the receptacle 26 for cleaning purposes.

Thus, what has been described is a new and unique egg contents remover which does not destroy the eggshell. The invention is described in various preferred embodiments including one specially designed for children incorporating a hand-holdable base and allowing one-handed operation. A second embodiment employs a shelf-type housing utilizing an air pump to force air into the air inlet tube which is protrudable within the egg and having the egg receptacle holding the egg positioned on a platform above a receptacle for receiving the egg yolk and whites. Various versions of this shelf-type housing embodiment of the present invention have been disclosed further incorporating the air inlet tube projectable into the upper end of the egg, as well as various configurations of the egg contents receptacle for permitting separation of the egg white from the egg yolk. The present invention by providing a means for adequately forcing air within the egg allows the egg white and yolk to be removed with no damage to the egg shell other than the one or two puncture holes placed therein for insertion of the air inlet tube and the egg discharge tube. Various embodiments of the air inlet tube and egg discharge tube have been disclosed which have been found to facilitate the efficient removal of the egg white and yolk from the eggshell.

It will thus be seen that the objects set forth above and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A non-destructing eggshell contents remover comprising:
   (A) an egg receiving cup assembly;
   (B) an egg discharge tube having an end passing through the egg receiving assembly and protrudable into an egg placed within said assembly for passage of the contents of the egg;
   (C) an air inlet tube having an end protrudable into an egg placed within the egg receiving assembly, interacting with the egg discharge tube for passage of gas into the egg;
   (D) means, interconnected with the air inlet tube, for forcing the passage of gas through said inlet tube into the egg; and
   (E) a hand-holdable base having a region dimensioned for receiving the egg cup assembly, and also having a handle, the gas forcing means positioned on the base in proximity to the handle so as to be operable by the user's hand, whereby the contents of an egg are removed through the egg discharge tube while causing minimal damage to the eggshell.

2. An egg contents remover as defined in claim 1, wherein the air inlet tube is adjacent the egg discharge tube in the region of the protruding end of the egg discharge tube into the egg; whereby only one puncture of the egg is made.

3. An egg contents remover as defined in claim 2, wherein the egg receiving cup assembly incorporates an egg cup receptacle fabricated from a soft resilient material and having a concave recess for placement of an egg, the egg discharge tube and air inlet tube protruding into the lowermost region of said recess.

4. An egg contents remover as defined in claim 1, wherein the gas forcing means comprises a bulb or bellows and a check valve for forcing air into the air inlet tube.

5. An egg contents remover as defined in claim 1, wherein the egg discharge tube and air inlet tube have sharp ends for easy protrusion into an egg with minimal cracking thereof.

6. An egg contents remover as defined in claim 5, wherein the air inlet tube further incorporates a plurality of transverse holes along the portion of its length protrudable within an egg for greater dispersion of gas into the egg.

7. An egg contents remover as defined in claim 1, wherein the air inlet tube incorporates a solid sharp protruding end for facilitating puncturing of an egg placed thereon and a plurality of transversely disposed holes near its protruding end for facilitating passage of air from the air inlet tube to the inner portion of an egg.

8. An egg contents remover as defined in claim 1, wherein the air inlet tube incorporates a hollow sharp protruding end and a plurality of transversely located holes along the longitudinal length of the protruding region of the air inlet tube for facilitating the passage of forced air from the air inlet tube to the inner portion of an egg.

9. An egg contents remover as defined in claim 1, further comprising an egg contents receiving receptacle placeable below the egg discharge tube for receiving egg contents.

10. An egg contents remover as defined in claim 1, wherein the egg receiving cup assembly incorporates a support member (34) having a central bore and an annular recess (33), and further incorporating a sleeve (29) with an upper shoulder (31) dimensioned to fit within the annular recess (33) of support member (34), the sleeve having an inwardly extending shoulder (31'); and wherein the egg discharge tube (42) removably rests at its lower termination on the inwardly extending shoulder (31') of the sleeve (29) and wherein the egg discharge tube has an aperture (39) dimensioned for receipt of the air inlet tube; whereby the egg discharge tube and air inlet tube may be easily removed from the remaining structure of the egg contents remover so as to facilitate cleaning thereof.

11. A non-destructing eggshell egg contents remover comprising:
 (A) an egg receiving cup assembly having,
  (1) an egg cup receptacle fabricated from a soft resilient material with a concave recess for placement of an egg, and
  (2) means for removal of overflow egg contents;
 (B) an egg discharge tube having an end passing through the egg receiving assembly and protrudable into an egg placed within the assembly for passage of the contents of the egg;
 (C) an air inlet tube having an end protrudable into an egg placed within the egg receiving assembly, interacting with the egg discharge tube for passage of gas into the egg; and
 (D) means, interconnected with the air inlet tube, for forcing the passage of gas through said inlet tube into the egg; whereby the contents of an egg are removed through the egg discharge tube while causing minimal damage to the eggshell.

12. An egg contents remover as defined in claim 11, wherein the overflow egg contents removing means comprises a series of channels passing through the egg receiving member about the egg discharge tube.

13. A non-destructing eggshell egg contents remover comprising:
 (A) an egg receiving cup assembly;
 (B) an air inlet tube having an end protrudable into an egg placed within the egg receiving assembly for passage of gas into the egg;
 (C) an egg discharge tube having an end passing through the egg receiving assembly and protrudable into an egg placed within the assembly for passage of the contents of the egg, the tube having a larger diameter than the air inlet tube and incorporating an elongated indented region about a portion of its protruding end for adjacent placement of a portion of the air inlet tube, so as to align and help maintain the air inlet tube within the recess of the egg cup receptacle and to have only one puncture made in the egg; and
 (D) means, interconnected with the air inlet tube, for forcing the passage of gas through said inlet tube into the egg; whereby the contents of an egg are removed through the egg discharge tube while causing minimal damage to the eggshell.

14. A non-destructing eggshell egg contents remover comprising:
 (A) an egg receiving cup assembly;
 (B) an egg discharge tube having an end passing through the egg receiving assembly and protrudable into an egg placed within the assembly for passage of the contents of the egg;
 (C) an air inlet tube having an end protrudable into an egg placed within the egg receiving assembly, interacting with the egg discharge tube for passage of gas into the egg;
 (D) means, interconnected with the air inlet tube, for forcing the passage of gas through the inlet tube into the egg; and
 (E) a base having a region dimensioned for receiving the egg cup assembly wherein said base has a recessed portion having a plurality of holes surrounding the region where the egg receiving member is inserted so as to allow passage through the base of any egg contents spilled outside the egg receiving assembly.

15. An egg contents remover as defined in claim 14, wherein the base further incorporates downwardly depending legs for supporting the device over an egg contents receiving container.

16. An egg contents remover as defined in claim 15, wherein the base further incorporates a handle for grasping the device, said handle having a region in which the gas forcing means is attached positioned for activation by the user's hand grasping the handle.

17. An egg contents remover as defined in claim 16, wherein the base is in the overall shape of a fanciful character or animal.

18. A non-destructing eggshell egg contents remover comprising:
 (A) an egg receiving cup assembly;
 (B) a shelf-type housing incorporating a platform having an aperture through which said egg receiving cup assembly passes,
 (C) an egg discharge tube having an end passing through the egg receiving assembly and protrudable into an egg placed within the assembly for passage of the contents of the egg;
 (D) an air inlet tube having an end protrudable into an egg placed within the egg receiving assembly, interacting with the egg discharge tube for passage of gas into the egg; and
 (E) a manually operable air pump mounted to the platform of the shelf-type housing and interconnected with the air inlet tube, for forcing the passage of gas through the inlet tube into the egg.

19. An egg contents remover as defined in claim 18, wherein said platform is slidably removable from said shelf-type housing.

20. An egg contents remover as defined in claim 19, wherein the shelf-type housing incorporates a pair of sidewalls, each sidewall having a channel, wherein each of the channels has a downward depression at the rearwardmost portion thereof, the platform slidably interfitting with the channels, and wherein the platform further comprises downward projections at the rearwardmost portion thereof for interfitting with the downward depressions of the channels; thereby locking said platform within the channels while allowing easy removal of the platform by manually lifting the rearwardmost portion of the platform with simultaneous pulling of the platform away from the shelf-type housing.

21. A non-destructing eggshell egg contents remover comprising:
(A) an egg receiving cup assembly;
(B) an egg discharge tube having an end passing through the egg receiving assembly and protrudable into an egg placed within the assembly for passage of the contents of the egg;
(C) an air inlet tube having an end protrudable into an egg placed within the egg receiving assembly, interacting with the egg discharge tube for passage of gas into the egg;
(D) means, interconnected with the air inlet tube, for forcing the passage of gas through the inlet tube into the egg; and
(E) a shelf-type housing incorporating:
(1) a back wall,
(2) a lower platform extending perpendicularly away from said back wall, said platform having a central aperture for mounting thereon the egg receiving cup assembly,
(3) an upper platform extending perpendicularly away from the back wall in juxtaposed spaced relationship to the lower platform, said upper platform having a central aperture,
(4) an upper egg receiving member frictionally slidably interfitting through the aperture in said upper platform and having a recess for receipt of at least a portion of the upper portion of an egg placed within the egg receiving cup assembly, wherein said air inlet tube protrudes downwardly into the recess of the upper egg receiving member;

whereby an egg placed within the egg receiving cup assembly has a puncture placed therein by the egg discharge tube, and an oppositely positioned hole placed within the egg when the upper egg receiving member is moved downward causing the air inlet tube to puncture the egg, thereby allowing forced gas to enter the egg and removal of the egg contents through the egg discharge tube.

22. An egg contents remover as defined in claim 21, wherein the back wall further incorporates a channeled member having a central passageway passing therethrough, and wherein said gas forcing means incorporates an air pump interconnected with the central passageway of the channeled member at one end of the member and a flexible hose interconnecting the air inlet tube to the other end of the channeled member for completing the passage of compressed air from the air pump to the air inlet tube.

23. An egg contents remover as defined in claim 22, wherein the egg receiving cup assembly and the upper egg receiving member are formed from rubber or other soft elastomer material.

24. An egg contents remover as defined in claim 21, wherein the shelf-type housing further comprises a pair of lower and upper outwardly extending channel members connected to the backwall with which the lower and upper platforms respectively slidably interfit for allowing easy removal of the platforms for cleaning purposes.

25. A non-destructing eggshell egg contents remover comprising:

(A) an egg receiving cup assembly formed of a soft resilient material;
(B) an egg discharge tube having an end passing through the egg receiving assembly and protrudable into an egg placed within said assembly for passage of the contents of the egg, the tube incorporating a swaged region or an outwardly extending flange below its protruding end to help secure the discharge tube within the egg receiving cup assembly so as to counteract any movement thereof when an egg is forced onto the protruding end of the discharge tube;
(C) an air inlet tube having an end protrudable into an egg placed within the egg receiving assembly, interacting with the egg discharge tube for passage of gas into the egg; and
(D) means, interconnected with the air inlet tube, for forcing the passage of gas through the inlet tube into the egg;

whereby the contents of an egg are removed through the egg discharge tube while causing minimal damage to the eggshell.

26. A non-destructing eggshell egg contents remover comprising:
(A) an egg receiving cup assembly;
(B) an egg discharge tube having an end passing through the egg receiving assembly and protrudable into an egg placed within the assembly for passage of the contents of the egg, the tube incorporating a region comprising an elongated corrugated surface protrudable into the egg receiving cup assembly so as to form vertically disposed sluiceways between the egg discharge tube and the corresponding region of the egg receiving cup assembly for facilitating removal of egg contents within the egg receiving cup assembly;
(C) an air inlet tube having an end protrudable into an egg placed within the egg receiving assembly, interacting with the egg discharge tube for passage of gas into the egg; and
(D) means, interconnected with the air inlet tube, for forcing the passage of gas through the inlet tube into the egg;

whereby the contents of an egg are removed through the egg discharge tube while causing minimal damage to the eggshell.

27. A non-destructing eggshell egg contents remover comprising:
(A) an egg receiving cup assembly incorporating a plurality off elongated scalloped regions;
(B) an egg discharge tube having an end passing through the scalloped regions of the egg receiving assembly and protrudable into an egg placed within the assembly for passage of the contents of the egg, the tube combining with the scalloped regions of the cup assembly to form vertically disposed sluiceways so as to facilitate removal of egg contents within the egg receiving cup assembly;
(C) an air inlet tube having an end protrudable into an egg placed within the egg receiving assembly, interacting with the egg discharge tube for passage of gas into the egg; and
(D) means, interconnected with the air inlet tube, for forcing the passage of gas through the inlet tube into the egg;

whereby the contents of an egg are removed through the egg discharge tube while causing minimal damage to the eggshell.

28. A non-destructing eggshell egg contents remover comprising:
(A) an egg receiving cup assembly;
(B) an egg discharge tube having an end passing through the egg receiving assembly and protrudable into an egg placed within the assembly for passage of the contents of the egg;
(C) an air inlet tube having an end protrudable into an egg placed within the egg receiving assembly, interacting with the egg discharge tube for passage of gas into the egg, the air inlet tube incorporating an insert having a sharp protruding end at one end and a downwardly projecting region for telescopingly interfitting with the remaining portion of the air inlet tube, said remaining portion incorporating a plurality of transversely located holes along the longitudinal length of its protruding region and a large air escape aperture at its uppermost region for facilitating the passage of air from the air inlet tube to within the egg placed thereon, said telescoping member of the air inlet tube being replaceable for repair and to facilitate cleaning of the remaining portion of the air inlet tube; and
(D) means, interconnected with the air inlet tube, for forcing the passage of gas through the inlet tube into the egg;
whereby the contents of an egg are removed through the egg discharge tube while causing minimal damage to the eggshell.

29. A non-destructing eggshell egg contents remover comprising:
(A) an egg receiving cup assembly;
(B) an egg discharge tube having an end passing through the egg receiving assembly and protrudable into an egg placed within the assembly for passage of the contents of the egg;
(C) an air inlet tube having an end protrudable into an egg placed within the egg receiving assembly, interacting with the egg discharge tube for passage of gas into the egg;
(D) means, interconnected with the air inlet tube, for forcing the passage of gas through the inlet tube into the egg; and
(E) an egg contents receiving receptacle placeable below the egg discharge tube for receiving egg contents, the receptacle incorporating a median partition having an upper transversely disposed lip, said partition for separating the egg white from the egg yolk and for allowing removal of either the egg white or the egg yolk without spilling of the other egg contents portion;
whereby the contents of an egg are removed through the egg discharge tube while causing minimal damage to the eggshell.

30. An egg contents remover as defined in claim 29, wherein the egg contents receiving receptacle further incorporates side ribs upwardly extending along a portion of the inner periphery of the egg contents receiving receptacle, said partition slidably interfitting with said side ribs for allowing easy cleaning of the partition, said partition further incorporating a second transversely disposed lip at its upper end for allowing in any order the removal of egg contents from the egg contents receptacle.

31. A non-destructing eggshell egg contents remover comprising:
(A) a base having a mounting aperture passing therethrough;
(B) an egg receiving cup assembly incorporating,
(1) a support member having a downwardly depending neck with a central bore passing therethrough, said neck mounted to and passing through said mounting aperture in the base, and
(2) an egg cup receptacle mounted on the support member having an upwardly extending concave recess dimensioned for sealing insertion of an egg, and a central bore passing through the lowermost portion of the concave recess and communicating with the central bore within the support member;
(C) an egg discharge tube having an end passing through the central bore of the egg cup receptable into the lowermost region of the concave recess of the egg cup receptacle and thereby protrudable into an egg placed within said concave recess, said tube for receipt of the egg contents within the egg placed in the concave recess of the egg cup receptacle and for transmission of these egg contents through the central bore of the support member;
(D) an air inlet tube having an end protrudable into an egg placed in the concave recess of the egg cup receptacle, for passage of air into said egg; and
(E) means, interconnected with the air inlet tube for forcing air through said inlet tube into the egg;
whereby the contents of the egg are removed through the egg discharge tube while causing minimal damage to the eggshell.

32. An egg contents remover as defined in claim 31, wherein the air inlet tube is adjacent the egg discharge tube in the region of the protruding end of the egg discharge tube into the egg; whereby only one puncture of the egg is made.

33. An egg contents remover as defined in claim 32, wherein the egg cup receptacle is fabricated from a soft resilient material for safely grasping the egg placed within the concave recess of the egg cup receptacle.

34. An egg contents remover as defined in claim 31, wherein the air inlet tube extends upwardly within the concave recess of the egg cup receptacle to a height greater than the uppermost termination of the egg discharge tube but at a height below the upper termination of the egg cup receptacle.

35. An egg contents remover as defined in claim 31, wherein the end of the air inlet tube protrudable within the concave recess of the egg cup receptacle has a sharp end for facilitating puncturing a hole within the egg placed within the egg cup receptacle recess and wherein the egg discharge tube also has a sharp protruding end into the recess of the egg cup receptacle, also for facilitating the puncture of said egg.

36. An egg contents remover as defined in claim 31, wherein the support member incorporates an annular recess at the upper termination of the central bore passing through the neck portion of the support member and wherein the egg receiving cup assembly further incorporates a cylindrical sleeve having a shoulder at its upper termination, said sleeve and shoulder respectively dimensioned for interfitting with the central bore and upper recess of said support member, said sleeve having an inner diameter dimensioned for receipt of the lower termination of the egg discharge tube and further incorporating an inwardly extending shoulder for supporting said lower termination of the egg discharge tube; whereby various egg discharge tubes may be installed within the egg receiving cup assembly by use of sleeves having various inner diameters.

37. An egg contents remover as defined in claim 36, wherein the support member further incorporates an outwardly extending tab and wherein the base further incorporates a recess along a portion of the periphery of its mounting aperture dimensioned for interfitting with said tab for registering the support member onto the base.

38. An egg contents remover as defined in claim 31, wherein the support member further incorporates a cylindrical upwardly extending recess dimensioned for receipt of the egg discharge tube and also incorporates an upwardly extending cylindrical cavity for receipt of the air inlet tube, said air inlet tube thereby having a straight line configuration.

39. An egg contents remover as defined in claim 38, wherein the support member further incorporates a radially extending aperture interconnecting the air inlet tube cavity with the means for forcing air into the inlet tube.

40. A non-destructing eggshell egg contents remover comprising:
(A) an egg receiving cup assembly incorporating an egg cup receptacle fabricated from a soft resilient material and having a concave recess for placement of an egg;
(B) an egg discharge tube having an end passing through the concave recess of the egg cup receptacle at the lowermost region of the recess so as to be protrudable into an egg placed within the cup assembly for passage of the contents of the egg;
(C) an air inlet tube extending upwardly in the recess of the cup receptacle with its protruding end substantially parallel with the egg discharge tube, the air inlet tube having a portion with a concave shape corresponding with the concave recess of the egg cup receptacle, the concave portion extending upwardly beyond the termination of the egg cup receptacle; and
(D) means, interconnected with the extended termination of the air inlet tube for forcing the passage of gas through the air inlet tube into the egg;
whereby the contents of the egg are removed through the egg discharge tube while causing minimal damage to the eggshell.

41. An egg contents remover as defined in claim 1, wherein the gas forcing means comprises an air bulb or air bellows.

42. An egg contents remover as defined in claim 31, wherein the support member has a first cylindrical recess dimensioned for receipt of the egg discharge tube so as to allow the egg discharge tube to be easily inserted and removed from the recess, and also has a cavity dimensioned for receipt of the air inlet tube so as to allow easy insertion and removal of the air inlet tube from the cup assembly and thereby provide for easy and efficient cleaning of the cup assembly, egg discharge tube, and air inlet tube.

* * * * *